United States Patent
Giordano

(10) Patent No.: US 7,610,299 B2
(45) Date of Patent: Oct. 27, 2009

(54) METHOD OF PROCESSING DATA

(75) Inventor: Anthony David Giordano, Detroit, MI (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/565,000

(22) Filed: Nov. 30, 2006

(65) Prior Publication Data

US 2008/0133455 A1 Jun. 5, 2008

(51) Int. Cl.
G06F 17/00 (2006.01)
(52) U.S. Cl. .................. 707/101; 707/102; 707/103 R; 707/104.1
(58) Field of Classification Search .............. 707/1–10, 707/100–104.1, 200–206
See application file for complete search history.

(56) References Cited

U.S. PATENT DOCUMENTS

| | | | |
|---|---|---|---|
| 5,345,586 A | 9/1994 | Hamala et al. | |
| 5,884,310 A | 3/1999 | Brichta et al. | |
| 6,513,059 B1 | 1/2003 | Gupta et al. | |
| 7,418,449 B2 * | 8/2008 | Sommerfield et al. | ....... 707/100 |
| 2003/0149586 A1 | 8/2003 | Chen et al. | |
| 2003/0195853 A1 | 10/2003 | Mitchell | |
| 2004/0199905 A1 | 10/2004 | Fagin et al. | |
| 2005/0086360 A1 | 4/2005 | Mamou et al. | |

OTHER PUBLICATIONS

"Data Integration Advisor: Data Integration Depends on Vigilant Data Modeling," Rick Sherman, DMReview.com, Dec. 1, 2004, 4 pages.

* cited by examiner

*Primary Examiner*—Isaac M Woo
(74) *Attorney, Agent, or Firm*—John R. Pivnichny

(57) ABSTRACT

Data is extracted from multiple diverse sources and copied into an initial staging area in order to be processed. A copy of the data is persisted in non-volatile storage. Quality functions perform checking on the copy and store a checked copy into a clean staging area. New data elements are created by enriching the checked copy. Joins, lookups, aggregations, and delta processing are used to process the data which is then formatted and filtered into a target filtering area making the data load-ready for target applications.

1 Claim, 4 Drawing Sheets

METHOD OF PROCESSING DATA

TECHNICAL FIELD

The invention relates to modeling method of processing data from various sources to make it load-ready for target applications using target architecture.

BACKGROUND OF THE INVENTION

The total volume of data available in a business today is huge and increasing daily. Businesses need to integrate data from sources to target applications through the use of software developed for this purpose. The process for developing such software involves use of software development tools along with manual entry of requirements into spreadsheets. The software is often referred to as ETL (Extract, Transform, and Load), while the processes performed by the software are known as data integration processes.

Spreadsheets containing the requirements, once completed, are then given to an ETL Developer for the design and development of maps, graphs, and source code. However, this current process of documenting requirements from source systems into spreadsheets and then mapping these requirements into an ETL software, also called herein a data integration package, is time-consuming and prone to error.

For example, it takes a considerable amount of time to copy source metadata from source systems into a spreadsheet. The same source information must then be re-keyed into an ETL development tool. This source information metadata capture in a spreadsheet is largely non-reusable, unless a highly manual review and maintenance process is instituted.

Capturing source-to-target mappings with transformation requirements contains valuable navigational metadata that can be used for data lineage analysis. Capturing this information in a spreadsheet does not provide a clean automated method of capturing this valuable information.

Despite best efforts, manual data entry often results in incorrect entries. For example, incorrectly documenting an INT (integer) data type as a VARCHAR in a spreadsheet will require an ETL software developer to take time to analyze and correct.

Data analysts who perform the source-to-target mappings manually have a tendency to capture source/transform/target requirements at different levels of completeness. When there is not a standard approach to the requirements and design of the data integration process, there will be misinterpretation by the development staff in the coding requirements found in the spreadsheet source-to-target mapping documents, which will result in coding errors and lost time.

These and other shortcomings of current methods result because a typical data integration software development project requires the steps of analysis, design, and development (also referred to in the art as construction). Current tools for data integration are intended for use in the construction step only and do not address the analysis and design steps.

Improved methods are therefore needed to achieve better results in the art of data integration software development.

Traditional solution to integrating multiple data sources is to create a new data warehouse and copy the data from the original diverse data sources to the warehouse. This solution is not flexible to dynamic changes in the data sources. Brichta et al., for example, in U.S. Pat. No. 5,884,310 describe such a solution in which a common database server has a load engine. A plurality of source systems, each having an extraction engine and a transformation engine, have source databases that store data in disparate formats and file structures. The common database server load engine loads the disparate data which is extracted and transformed into a common database after which it may be provided to one or more target client systems.

Fagin et al. in U.S. Patent Application US 2004/0199905 describe a system and method for translating data from a source schema to a target schema. User inputs define a set of correspondences between the source schema and the target schema using an interpretation process of semantic translation.

Hamala et al, in U.S. Pat. No. 5,345,586 describe solving the problem of integrating multiple data sources by using a global data directory which maps the location of data, specific data entity attributes, and data source parameters.

Chen et al., in U.S. Patent Application US 2003/0149586 describe processing information for root cause analysis, including structured and unstructured data. The unstructured data is converted into a second structured format. The two structured data are collected and stored into memory.

Gupta et al, in the U.S. Pat. No. 6,513,059 and Mitchell in U.S. Patent Application US 2003/0195853 both mention data integration but do not address the aforementioned shortcomings of present data integration methods.

All of the above U.S. Patents and Patent Applications by Brichta, Fagin, Cupta, Mitchell, Hamala, and Chen shall be incorporated herein by reference in their entirety for any purpose.

It is believed that improved methods for performing data integration software development would constitute a significant advancement in the art.

OBJECTS AND SUMMARY OF THE INVENTION

It is therefore a principal object of the present invention to provide a method of performing data integration having enhanced capabilities.

It is another object to provide such a data integration method wherein enhanced operational capabilities are possible.

It is a further object to provide such a method which can be readily practiced by a services providing organization.

These and other objects are attained in accordance with one embodiment of the present invention wherein there is provided a method of processing data, comprising the steps of; extracting data from sources and copying to an initial staging area, persisting the copy of data from sources in a non-volatile storage, performing quality checking using quality functions or components on the copy and storing the quality checked copy in a clean staging area of storage, enriching the quality checked copy by creating new data elements or new datasets derived therefrom, processing data in the clean staging area by the functions of joins, lookups, aggregations, or delta processing, formatting and filtering data from the clean staging area into a target filtering area, thereby making the data load-ready for target applications, and creating target-specific load-ready files.

In accordance with another embodiment of the present invention, there is provided the method of processing data of the previous paragraph including deploying process software for the processing data, the deployment comprising; installing the process software on at least one server, identifying server addresses for users accessing the process software on the at least one server, installing a proxy server if needed, sending the process software to the at least one server via a file transfer protocol, or sending a transaction to the at least one server containing the process software and receiving and copying the process software to the at least one server's file system, accessing the process software on a user's client computer file system, and executing the process software by the users.

BEST MODE FOR CARRYING OUT THE INVENTION

For a better understanding of the present invention, together with other and further objects, advantages, and capabilities thereof, reference is made to the following disclosure and the appended claims in connection with the above-described drawings.

Figure 1:
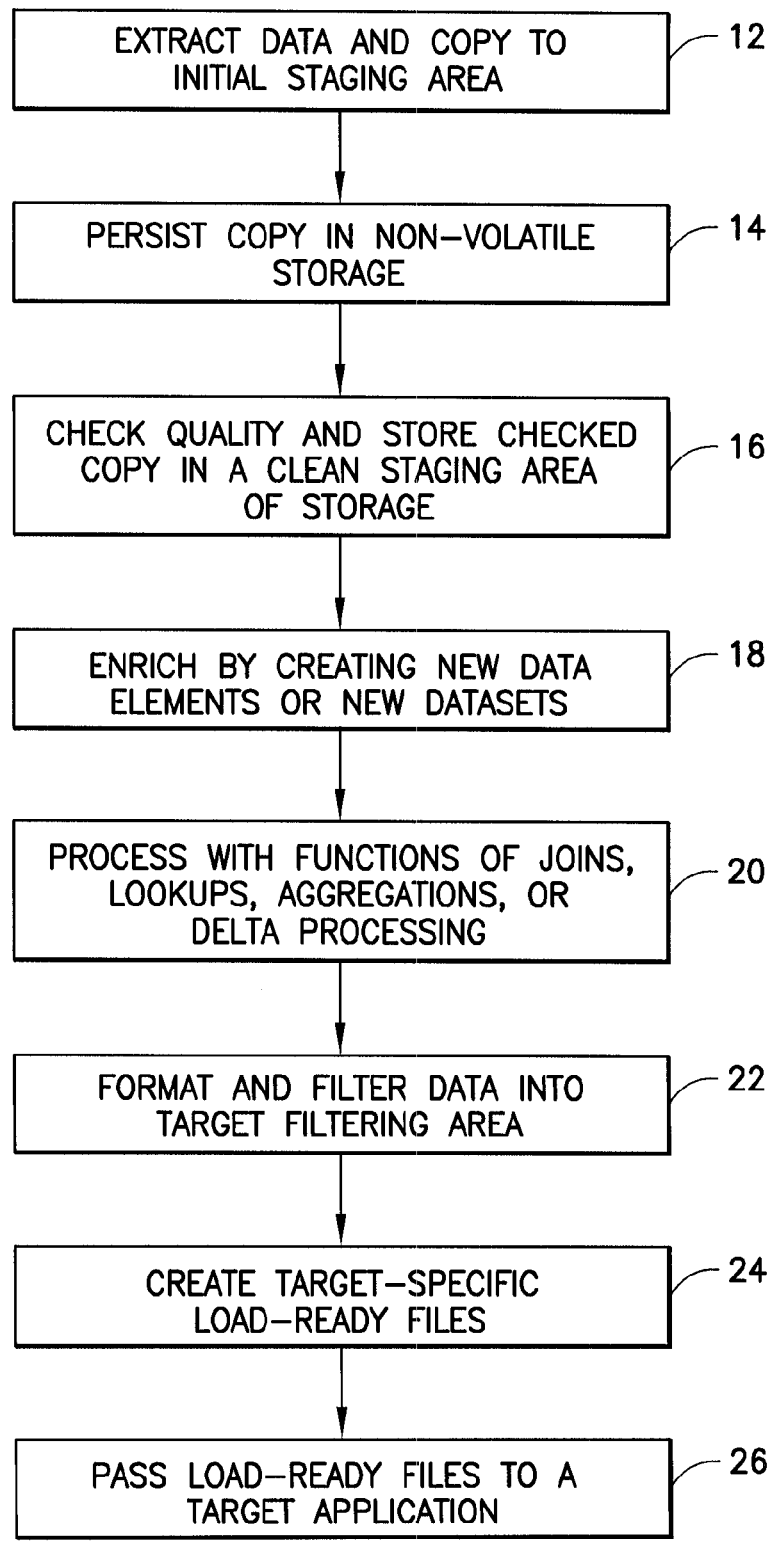
FIG. 1 is a flowchart depicting steps of a process for data integration in accordance with the present invention.

In FIG. 1, there is shown a flowchart for a method of processing data in accordance with the present invention. The steps of FIG. 1 may represent a data integration process development method using a specific architectural framework. For example, it is well known that companies collect all types of information in the form of data. Examples of data include financial data, product data, reliability data, customer feedback, employee data, and the like. In fact, there has been an explosion in the amount of information collected and the resulting databases. FIG. 1 therefore shows a technique for integrating data from diverse sources to make it useful to traditional target applications.

The steps of FIG. 1 represent the architectural framework or data integration architectural framework or data integration architecture for the process of integrating data. In step 12, data is extracted and copied to an initial staging area. Extraction is preformed as defined in a logical extraction component model, such as the one shown in FIG. 2.

The extraction step may involve the following tasks.
Confirm the Subject area focus.
Review whether the existing Data Integration environment can fulfill the requirements
Determine/Review Existing Applications/Databases
Determine/Review Existing Data Models and Metadata Repositories
Determine the business extraction rules
Estimate the data volumes for the production environment
Map Source File Formats to the Attribute Level
The initial staging area may be located in any storage device accessible by the computing system performing the extraction step. For example, the initial staging area may be located on a hard drive connected to the computing system. It may also be an area in main memory of a server, a network storage device, RAM memory, flash memory, or any other storage technology. In step 14, a copy of the extracted data is placed in a non-volatile storage, for purposes of persistence. Any of the various known non-volatile storage technologies may be used such as magnetic devices like hard drives, or semiconductor devices like flash, EPROM, EEPROM.

Figure 3A:
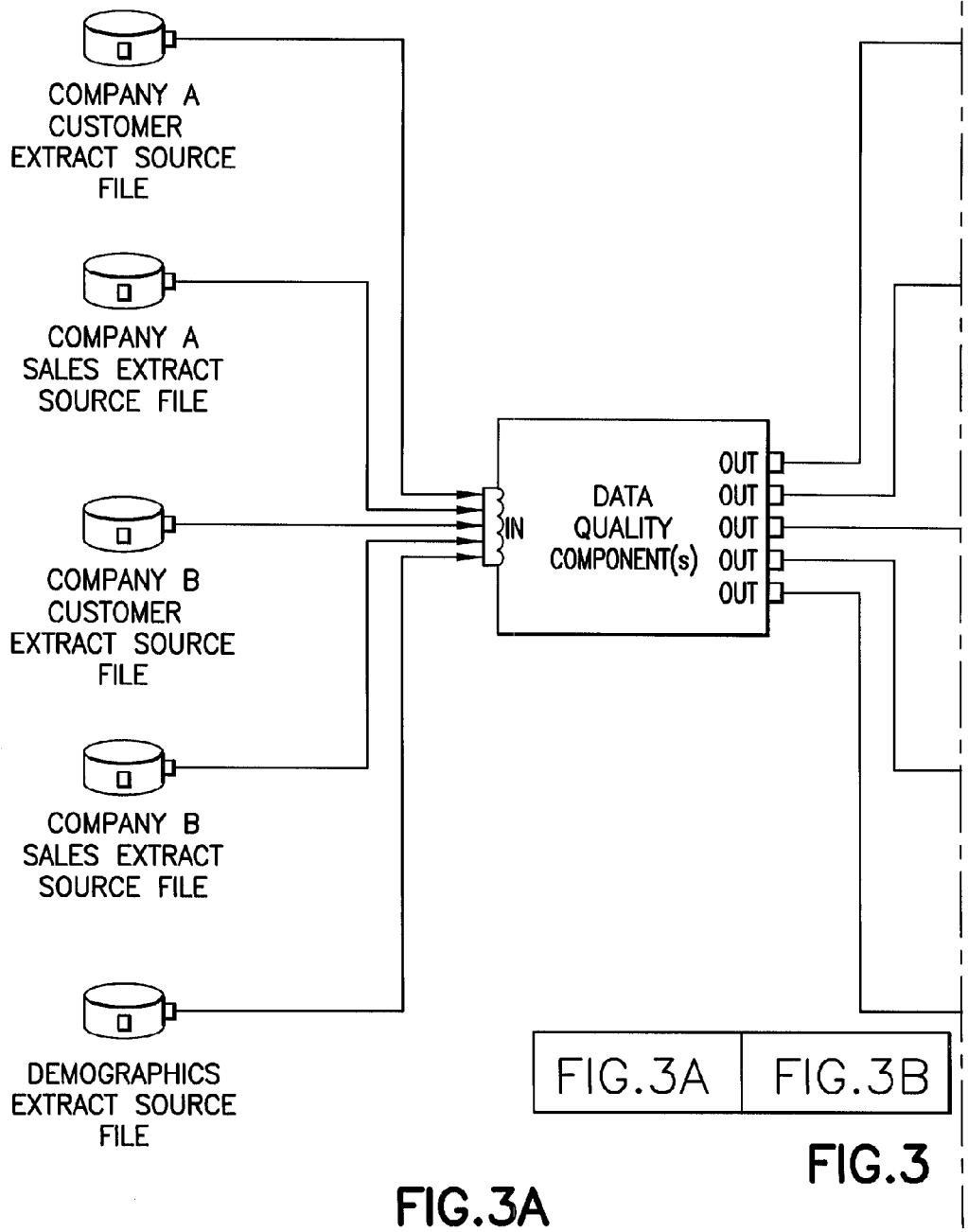
FIG. 3 is a data quality step flow diagram.
Figure 3B:
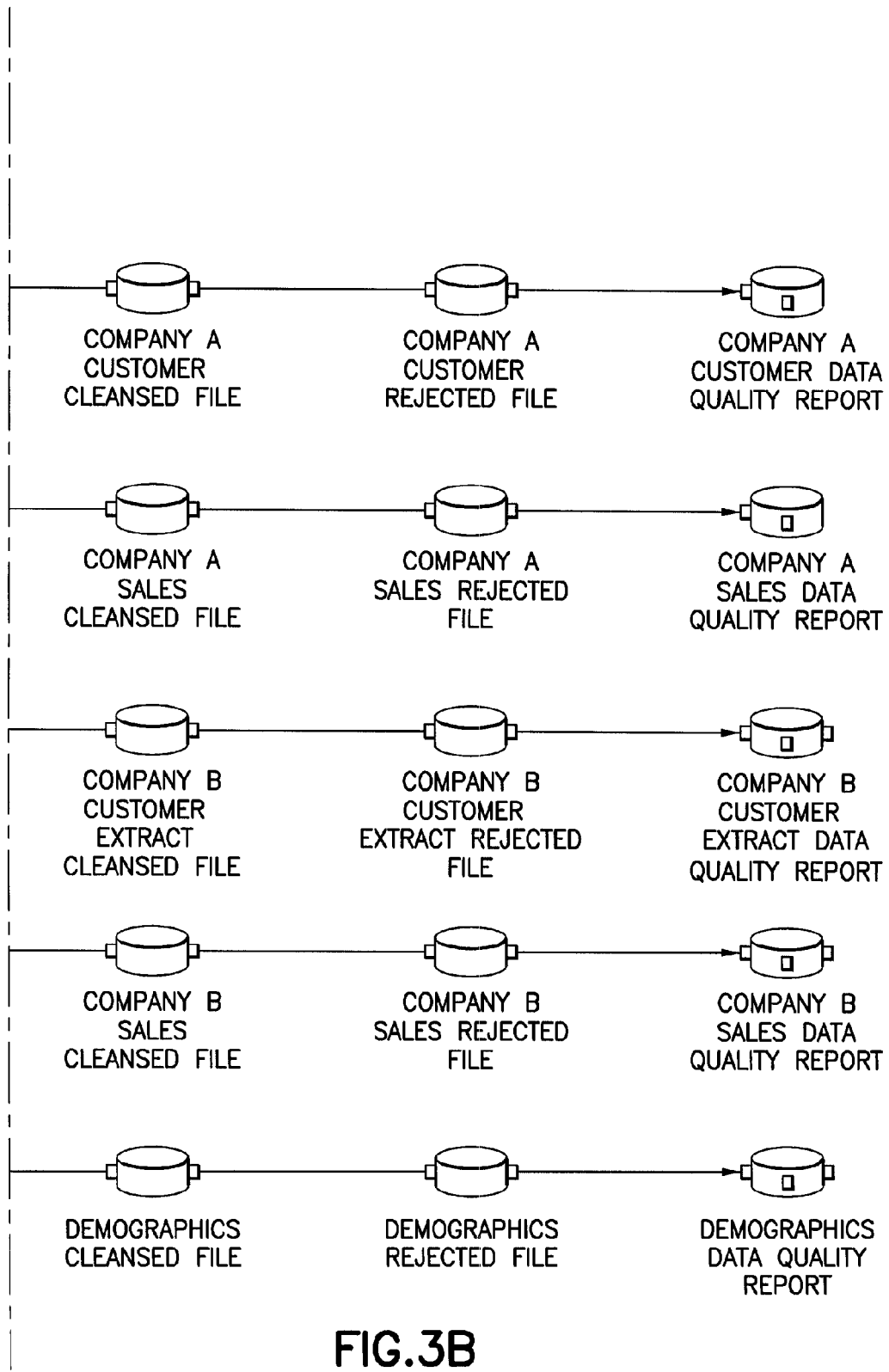

In step 16, the quality of the extracted data is checked and a checked copy, also known herein as a cleansed file, is stored in a clean staging area. A quality component model, such as shown in FIG. 3, may be used to define and describe step 16. Defining the quality checking step may involve the following tasks.
Identify Critical Tables and Data Elements Columns
Identify Data Quality Criteria (domains, ranges)
Determine which identified data quality criteria is absolute
Determine which identified data quality criteria is optional
Determine Cleanse Requirements
Capture DQ Criteria into Metadata Repository
The clean staging area of storage may be located in the same storage used in step 12 or in a completely different storage without departing from the present invention.

In step 18, the data my be enriched to allow for the creation of new data elements that extend the data set or new data sets, that are derived from the source data. The enrichment capability includes calculations and splits. Calculations are developed in the tool and process data in a data set to produce derived data based on data transforms and computations. Splitting is an optimal technique developed in the tool, to divide a data set into subsets, called splits, of fields that are then stored individually.

In step 20, the data may be processed with the functions of joins, lookups, aggregations, or delta processing. Joins involve combining fields from multiple sources and storing the combined set. Lookups involve combining fields from records with values from reference tables and storing the combined set. Aggregations involve creation of new data sets derived from the combination of multiple sources or records. Delta processing involves identifying changed records from a source data set by comparing the values to the prior set from the source.

In step 22, the data is formatted and filtered into a target filtering area. Target filters are the first target specific component to receive data. Target filters format and filter multi-use data sources from the clean staging area, making these load-ready for targets. Both vertical and horizontal filtering is performed. With vertical filtering, only the data elements needed by the target are passed. With horizontal filtering, only those records that conform to the target's rules are passed.

In step 24, target-specific load-ready files are created and typically stored in a load-ready staging area. The load-ready staging area like the clean staging area above may be located in any accessible storage technology or medium known in the art, and my be located anywhere in a computer network.

In step 26, the load-ready files are passed to the target application. There are five types of loads which may be used. 1. FTP to target—the tool merely deposits the output to the target environment. 2. Piped data—the tool executes a load routine on the target that takes data directly piped from the target specific filter of step 22, effectively bypassing step 24. 3. RDBMS Utilities—uses DB2's Bulk Loader on the target to load data from the load-ready staging area. 4. SQL—SQL writes directly to the target database. 5. Messaging—uses a message data quality component for real time data fields.

Figure 2:
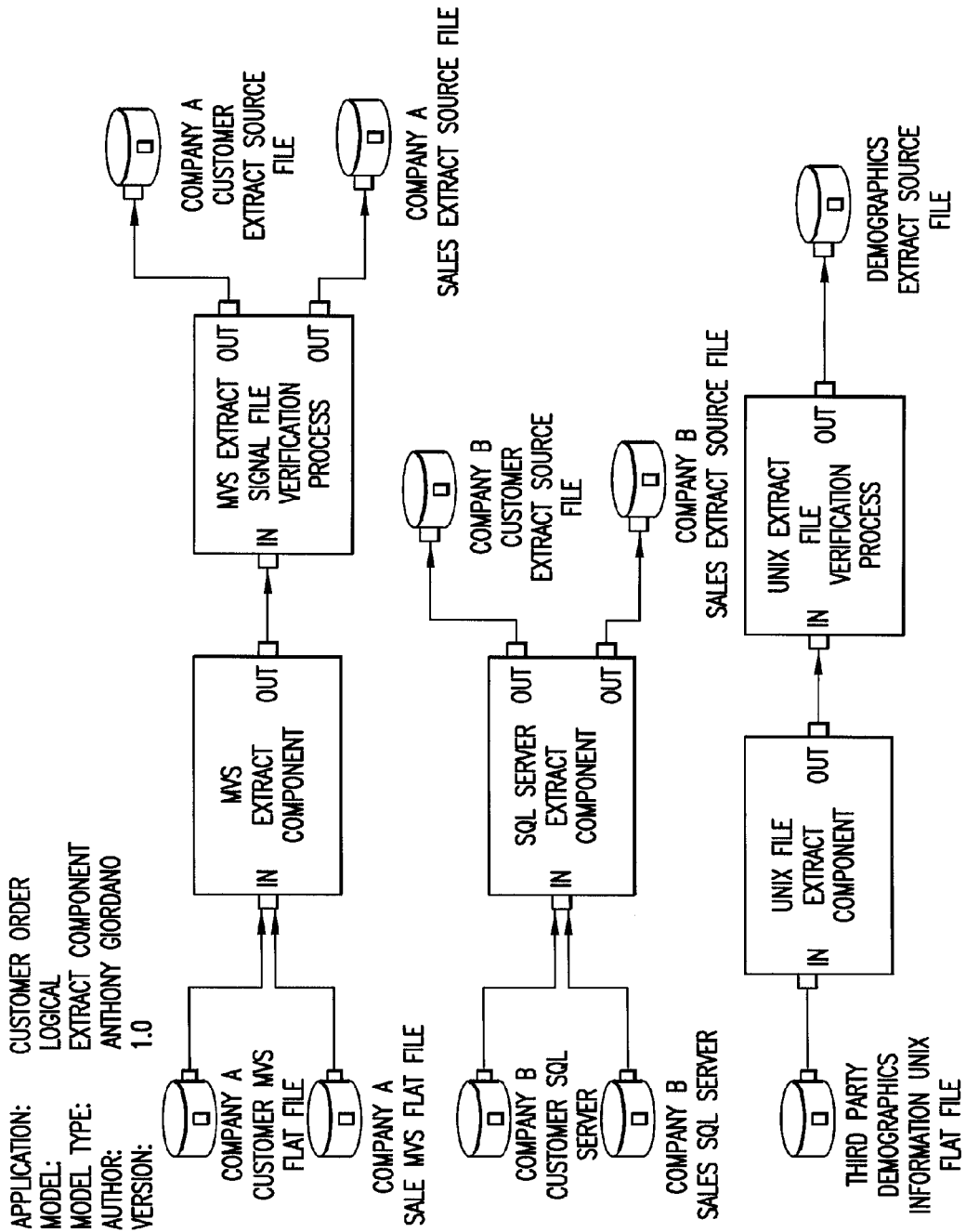
FIG. 2 is a logical extraction step flow diagram.

In FIG. 2, there is shown a flowchart example of the extract step 12 of FIG. 1. In FIG. 3, there is shown an example of a data quality step 16 of FIG. 1.

While there have been shown and described what are at present considered the preferred embodiments of the invention, it will be obvious to those skilled in the art that various changes and modifications may be made therein without departing from the scope of the invention as defined by the appended claims.

What is claimed is:
1. A method of deploying process software for processing data, said deployment comprising:
extracting data from sources and copying to an initial staging area;
persisting said copy of data from sources in a non-volatile storage;

performing quality checking using quality functions or components on said copy and storing the quality checked copy in a clean staging area of storage;

enriching the quality checked copy by creating new data elements or new datasets derived therefrom;

processing data in said clean staging area by the functions of joins, lookups, aggregations, or delta processing;

formatting and filtering data from said clean staging area into a target filtering area, thereby making said data load-ready for target applications;

creating target-specific load-ready files;

installing said process software on at least one server;

identifying server addresses for users accessing said process software on said at least one server;

installing a proxy server if needed;

sending said process software to said at least one server via a file transfer protocol, or sending a transaction to said at least one server containing said process software and receiving and copying said process software to said at least one server's file system;

accessing said process software on a user's client computer file system; and executing said process software by said users.

* * * * *